United States Patent
Laurent et al.

(10) Patent No.: US 7,453,951 B2
(45) Date of Patent: Nov. 18, 2008

(54) SYSTEM AND METHOD FOR THE TRANSMISSION OF AN AUDIO OR SPEECH SIGNAL

(75) Inventors: Pierre André Laurent, Bessancourt (FR); Cédric Demeure, Paris (FR)

(73) Assignee: Thales, Paris (FR)

( * ) Notice: Subject to any disclaimer, the term of this patent is extended or adjusted under 35 U.S.C. 154(b) by 783 days.

(21) Appl. No.: 10/173,243

(22) Filed: Jun. 18, 2002

(65) Prior Publication Data

US 2003/0012293 A1   Jan. 16, 2003

(30) Foreign Application Priority Data

Jun. 19, 2001   (FR) .................... 01 08040

(51) Int. Cl.
*H04L 27/00* (2006.01)
(52) U.S. Cl. .................................. 375/295
(58) Field of Classification Search ........... 375/295, 375/260, 285, 222, 327, 332, 341, 322, 347; 329/304; 370/19, 207
See application file for complete search history.

(56) References Cited

U.S. PATENT DOCUMENTS

| | | | | |
|---|---|---|---|---|
| 4,881,241 A | * | 11/1989 | Pommier et al. | 375/260 |
| 5,023,715 A | * | 6/1991 | Owada et al. | 375/240.24 |
| 5,243,685 A | | 9/1993 | Laurent | |
| 5,274,629 A | * | 12/1993 | Helard et al. | 370/208 |
| 5,425,050 A | | 6/1995 | Schreiber et al. | |
| 5,452,288 A | * | 9/1995 | Rahuel et al. | 370/203 |
| 5,454,007 A | * | 9/1995 | Dutta | 375/322 |
| 5,522,009 A | | 5/1996 | Laurent | |
| 5,550,812 A | * | 8/1996 | Philips | 370/203 |
| 5,663,990 A | * | 9/1997 | Bolgiano et al. | 375/138 |
| 5,673,292 A | * | 9/1997 | Carlin | 375/269 |
| 5,838,799 A | * | 11/1998 | Cioffi et al. | 381/2 |
| RE36,430 E | * | 12/1999 | Halbert-Lassalle et al. | 370/204 |
| 6,002,664 A | * | 12/1999 | Schachter | 370/207 |
| 6,016,469 A | | 1/2000 | Laurent | |
| 6,031,874 A | * | 2/2000 | Chennakeshu et al. | 375/262 |
| 6,038,261 A | * | 3/2000 | Mestdagh | 375/285 |
| 6,151,295 A | * | 11/2000 | Ma et al. | 370/203 |

(Continued)

FOREIGN PATENT DOCUMENTS

EP   0 939 527   9/1999

(Continued)

OTHER PUBLICATIONS

Roch Lefebvre, et al., "Spectral Amplitude Warping (SAW) for Noise Spectrum Shaping in Audio Coding" University of Sherbrooke, Quebec, Canada, J1K 2R1, Copyright 1997 IEEE, pp. 335-338.

*Primary Examiner*—Jean B Corrielus
(74) *Attorney, Agent, or Firm*—Oblon, Spivak, McClelland, Maier & Neustadt, P.C.

(57) ABSTRACT

A system and method for transmitting an analog signal. The analog signal is converted into complex numbers such that two successive audio samples respectively form a real part and an imaginary part of a respective complex number. The complex numbers are then dispersed in a time-frequency space. The complex numbers are then modulated through a digital modulator into temporal signals and the temporal signals are output for transmission. Thereby, a digital modulator conventionally used for modulating digital input signals can operate for the transmission of an analog signal.

18 Claims, 3 Drawing Sheets

U.S. PATENT DOCUMENTS

| | | | |
|---|---|---|---|
| 6,185,594 B1 * | 2/2001 | Hilton et al. | 708/270 |
| 6,288,631 B1 * | 9/2001 | Shinozaki et al. | 375/260 |
| 6,408,033 B1 * | 6/2002 | Chow et al. | 375/260 |
| 6,456,653 B1 * | 9/2002 | Sayeed | 375/227 |
| 6,625,113 B1 * | 9/2003 | Cupo et al. | 370/208 |
| 6,631,167 B1 * | 10/2003 | Cambonie et al. | 375/260 |
| 6,654,928 B1 * | 11/2003 | Terry et al. | 714/792 |
| 6,751,642 B1 * | 6/2004 | Cambonie et al. | 708/404 |
| 6,757,553 B1 * | 6/2004 | English | 455/562.1 |
| 6,807,145 B1 * | 10/2004 | Weerackody et al. | 370/203 |
| 6,944,120 B2 * | 9/2005 | Wu et al. | 370/208 |
| 6,985,537 B1 * | 1/2006 | Milbar | 375/265 |
| 2001/0028678 A1 * | 10/2001 | Kato et al. | 375/222 |
| 2002/0070796 A1 * | 6/2002 | Gay-Bellile et al. | 329/304 |
| 2002/0176510 A1 * | 11/2002 | Laroia | 375/267 |
| 2003/0189989 A1 * | 10/2003 | Kroeger | 375/295 |
| 2005/0083890 A1 * | 4/2005 | Plotnik et al. | 370/334 |

FOREIGN PATENT DOCUMENTS

FR     2 721 461     12/1995

* cited by examiner

SYSTEM AND METHOD FOR THE TRANSMISSION OF AN AUDIO OR SPEECH SIGNAL

BACKGROUND OF THE INVENTION

1. Field of the Invention

The present invention relates to a device and method for the transmission of an analog signal by using a digital type of modem.

Hereinafter in the description, the expression <<digital modem>> designates a modem that receives digital signals at input and gives digital type signals at output. For example, the invention relates to OFDM (Orthogonal Frequency Division Multiplexing), or COFDM (Coherent Orthogonal Frequency Division Multiplexing) type modems or again to serial type modems.

The invention can be applied to audio or speech type analog signals, possibly enciphered signals.

It can be applied also to OFDM type modulation for the high frequencies HF or single-carrier type modulation for the very high frequencies VUHF or again to spread-spectrum modulation, for example by direct sequence or EVF (Evasion Frequency). Single-carrier modulation can also be used in HF and OFDM modulation in VHF.

2. Description of the Prior Art

Various methods are described in the prior art for the radio transmission of a speech or audio signal in total security. Typically, these methods can be classified under two major groups:

1—The analog method, more commonly known as the "scrambler" method.

This type of method has been much used in the HF and VUHF ranges. The associated system consists of a pack, external or internal to the radio unit, which is interposed between the set and the radio unit.

According to one principle, the signal is mixed, typically according to a time-frequency grid pattern made on the basis of a Fourier transform of the input signal. Generally, a synchronization element is added in the form of a signal modulated at a carrier frequency in the audio band. This signal contains the information needed at reception, in order to synchronize the enciphering method. Once the signal has been mixed and is therefore difficult if not impossible to understand, it is transmitted by classic methods chosen according to the range of frequency envisaged, namely SSB (Single Side Band), AM (amplitude modulation) or FM (frequency modulation).

The principle has certain drawbacks. These are especially low resistance and possible interference-related deterioration. Another problem is that the added synchronization signal is not always audible. This method is therefore not very resistant to uncooperative, deciphering attacks, especially because of limits on the number of frequency side bands mixed as a function of the number of points taken in the FFT (Fast Fourier Transformation). By contrast, so long as the synchronization of the cipher is detected at reception, it is possible to descramble the received signal and therefore restore an audible signal even at a low signal-to-noise (S/N) ratio. Since the human ear is a very robust receiver, it restores the auditory signal fairly well even when the signal is highly noise-infested.

2—The Digital Method

There are also known ways of digitizing the speech signal or the audio signal, compressing it by using a vocoder or an audio compressor and then using a digital modem to transmit the bits that are preliminarily enciphered by means of a high-security digital cipher.

This method enables the use of high-quality ciphers. However, this raises certain problems related to bit rate, for example in HF, because there is a limited bit rate available in the conventionally allocated band, 3 kHz, in a digital transmission mode that is resistant to multiple paths (typically, with a spectral efficiency of one 1 bit/Hz/s).

Furthermore, there are limitations when the propagation channel of the signal is highly disturbed. This requires the use of interleaving and of an error-correction code that limits the bit rate, the maximum limit being in the range of 2.4 Kbits/s. The vocoder actually works at low bit rate and is therefore of medium quality. It is even possible to further reduce the bit rate to 800 bits/s, with a low quality vocoder and more robust encoding.

In the latter case, however, there remains the fact that the modem has a point of operation in the Binary Error Rate (BER) adapted to the vocoder and hence a certain signal-to-noise (S/N) ratio that depends on the transmission channel. Below this value of signal-to-noise ratio, the errors are far too numerous for the decoder to be able to correct them, and the signals produced at output of the vocoder are no longer audible, even if the modem is always capable of maintaining the synchronization because it is generally extremely robust.

There are also hierarchical encoding principles enabling the more efficient protection either of the most sensitive bits or of the bits used to reconstitute a minimum quality of the signal transmitted. The systems that implement these principles on the contrary reveal their limits fairly soon. The quality is quite mediocre and/or the signal loss related to the signal-to-noise ratio finally appears fairly quickly.

Similar types of systems exist in the VHF range, with modulations that are rather of the single-carrier type enabling the peak factor (the ratio of peak power to mean power) to be optimized and hence providing for an increase in the efficiency of the output amplifier.

SUMMARY OF THE INVENTION

The invention relies on a new approach which consists especially in transmitting an analog signal by using a digital type of modem.

The analog signal is transmitted as symbols of cells applied to a classic digital modulation.

The invention relates to a method for the transmission of an analog signal in a transmission system initially comprising digital samples (symbols that can take only a given number of values). It is characterized in that the original digital samples for the data are replaced by the analog signal to be transmitted.

The method comprises for example a step for the pre-processing of the analog signal before it is transmitted and a step of post-processing at reception.

It may use an OFDM or COFDM type modem, the analog signal being sent for example in the form of N independently modulated time/frequency cells.

The analog signal is, for example, sampled at a frequency Fe and the N samples obtained are distributed according to a fixed law of distribution in the cells.

It may use a continuous single-carrier type modem.

The steps of the above-mentioned method can be applied for example to the transmission of a speech or audio type analog signal.

The invention also relates to a device for the transmission of an analog signal comprising at least one digital type modem (initially comprising digital samples of symbols that can take given values) adapted to the reception of the analog signals.

It may comprises a device adapted to the application of a pre-processing operation before the transmission of the analog signal and a device for the post-processing of the signal at reception.

The modem is for example of the OFDM or COFDM type and the device may comprise a device for the sampling of the analog signal and a module adapted to the distribution of the samples of the signal according to a fixed law of distribution in the time-frequency cells of the modem.

The modem may also be of the single-carrier type.

The object of the present invention in particular has the following advantages:
  accurate operation for very values of low signal-to-noise (S/N) ratio,
  continuity of service whatever the conditions of reception, contrary to what is offered by a purely digital method,
  simplicity of implementation,
  high-quality digital enciphering (perfect protection)
  economy of resources: the invention uses exactly what is needed in terms of complex samples for sending the analog signal, namely N samples per second if the signal has the maximum frequency to be transmitted equal to N Hz. This minimizes the spectral occupation or maximizes spectral efficiency,
  the possibility of adding on ancillary processes designed to improve the quality of the analog signal at reception without difficulty since the system already has a majority of prepared digital processing operations,
  the assurance of audio signal quality at reception that remains constant for a given signal-to-noise (S/N) ratio, unlike in the case of classic amplitude modulation (AM):
    an absence of <<color>> due to the selective fading (compensation for the gain of the channel)
    no distortion whatsoever caused by the temporary disappearance of the residual carrier as in the case of the AM,
  a decorrelation of the disturbances due to the scramblers, through the interleaving, which makes their effect similar to that of impulsive noise and therefore to flat spectrum noise,
  a synchronization provided by the modulation used and the correction of the deterioration given by the channel,
  the use of a step of pre-accentuation or post-accentuation which also enables the transmitted signal to be made less sensitive to noise,
  the possibility of extending the method to numerous types of modulation OFDM, single-carrier, spread spectrum etc)
  compatibility with the burst-packet modes (EVF, TDMA Time division Multiple Access, etc)
  discretion: the signal sent resembles a classic digital modulation signal.

BRIEF DESCRIPTION OF DRAWINGS

Other features and advantages shall appear from the following detailed description of an embodiment, given by way of an exemplary illustration that in no way restricts the scope of the invention, illustrated by the appended drawings of which.

MORE DETAILED DESCRIPTION

In order to have a clearer understanding of the principles implemented in the present invention, the following description shall relate firstly to the transmission of an analog signal through the use of a COFDM type modem.

The method relies on the following idea: in a transmission system initially comprising digital samples (symbols that can take only a number of given values), the original digital samples at the disposal of the user are replaced by the audio or speech analog signal. The analog signal also takes the place of said original digital samples.

Figure 1:
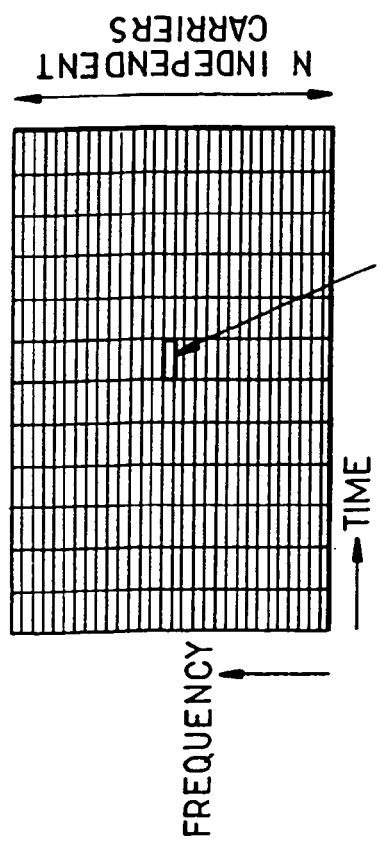
FIG. 1 is a drawing of a transmission of cells by a COFDM type modem in a time-frequency space.

FIG. 1 shows a diagram of a modem in a time-frequency space.

This modem may be described as a juxtaposition, in the entire transmission band, of a multitude, for example several hundreds, of elementary narrow-band modems.

The representation considers a two-dimensional time-frequency space (x-axis and y-axis) divided into independent elementary cells. Each cell indexed i is characterized by a given frequency Fi for a given point in time ti. A cell indexed i is associated with a complex number directly corresponding to the amplitude A(t) and to the phase $\Phi$ (t) that are assigned to it by the modulation used. The modulated signal S(t) is equal to $A(t)\cos(\omega t+\Phi(t))$.

The elementary cells may have different functions or roles, for example:
  some of them have a fixed content known to the receiver. They are used for the various types of synchronization necessary, such as time synchronization, frequency synchronization as well as for the continuous evaluation of the characteristics of the channel which may vary with time, for example the complex gain as a function of frequency (as a function essentially of the characteristics of the transmission channel), the signal-to-noise ratio on each frequency, this frequency possibly varying as a function of the level of the signal received and also because of interference, etc.
  Other cells have a "utilitarian" role (utility functions). They contain all the information by which the receiver can determine the characteristics of the signal that it is receiving, the type of audio encoding used, the transmission station, the list of frequencies on which it can receive the same station in the event of deterioration of reception, etc.
  all the other cells, in general the large majority of them, are available and used to transmit the useful information most of which, in this type of application, correspond to a digitized audio-frequency signal. These are available cells or free cells that will be used to implement the method according to the invention.

All the available cells are used to transmit a sampled analog signal. The cells will therefore be used in their totality or at least in their majority to transmit only analog samples of the speech signal or more generally of an audio signal in order to optimize the maximum spectral efficiency and propose a classic speech or audio transmission service.

This gives the following orders of magnitude:

For a speech signal (with a 300 Hz-3 KHz bandwidth for example), we have 2,700 complex samples per second if the sampling frequency is limited to the strict minimum. If we take a classic OFDM sizing to hold an HF channel with a time spread of 5 ms and a Doppler spread of 2 Hz, we obtain OFDM cells with a duration of about 30 ms (including 5 ms of guard time) giving a 40 Hz spread between carriers and therefore 75 useful carriers in 3 KHz band HF channel. This gives 75*33=2475 cells. If we take 10% of the cells used for the utility functions and for the different instances of synchronization, a "light" compression procedure at a rate of 2227/2700=0.82 is dictated. This is easily obtained with a signal compression (in frequency for example) pre-processing operation (and the associated post-processing operation).

For an audio signal (called a wideband signal) of the 50 Hz-16 KHz type, we obtain about 16,000 complex samples giving, for an HF channel, a bandwidth of about 18 KHz without compression.

In such a system, an interleaving with a substantial temporal length must be maintained so that the fluctuations of the channel can be resisted.

Figure 2:
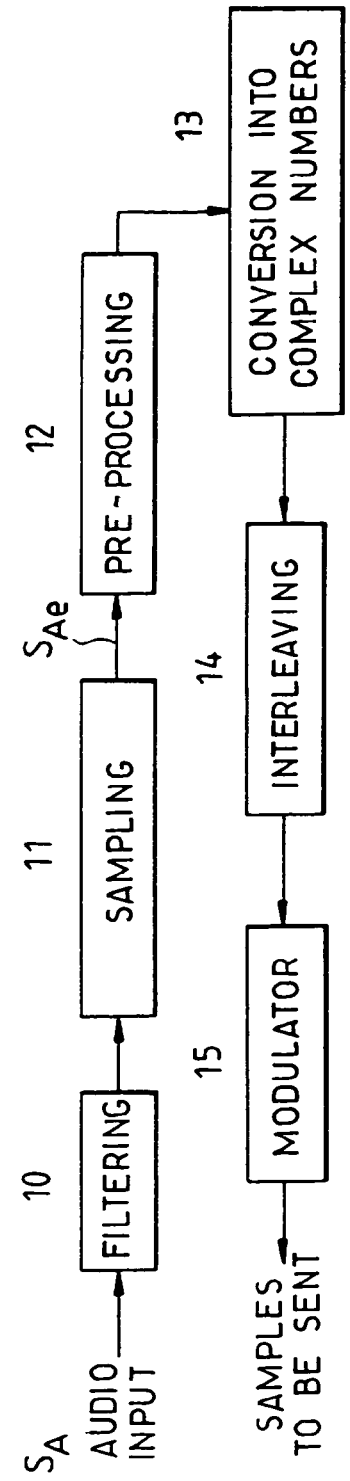
FIGS. 2 and 3 are block diagrams respectively of the transmission part and the reception part for a device with a COFDM type modem.
Figure 3:
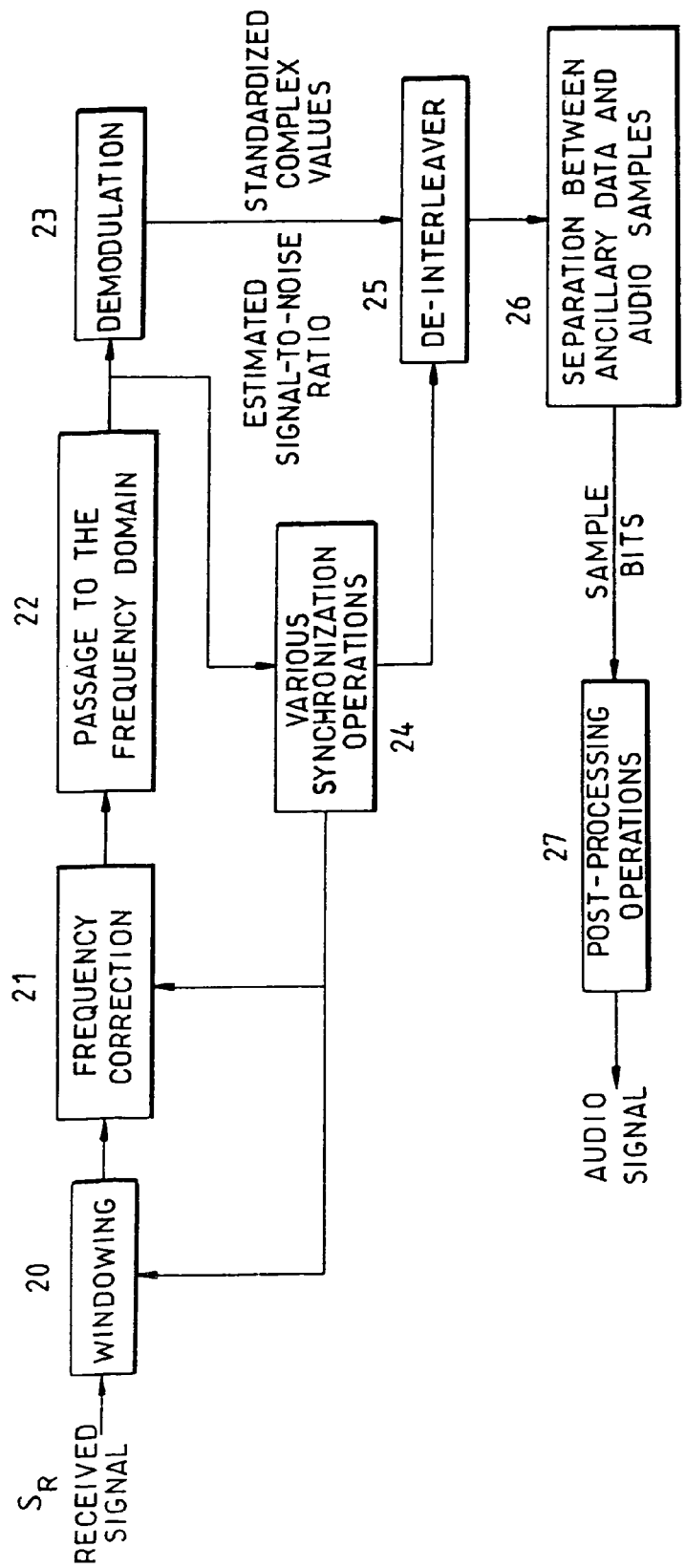

FIGS. 2 and 3 respectively represent the block diagrams for the transmission part and for the reception part of a system according to the invention, adapted to the transmission of an analog signal using a COFDM type modem.

The analog or audio input signal SA, passes through the following elements forming the transmission part (FIG. 2):

A bandpass filter 10, designed to limit the passband of the audio signal to obtain the filtered audio signal.

A system 11 for sampling the filtered audio signal. This signal is, for example, sampled at a frequency Fe which guarantees a passband sufficient to prevent any loss in quality. This establishes a minimum number $N_{min}$ of cells to be assigned to this function. The use of a reduced frequency, for example between 4 and 8 KHz, may be sufficient. The sampled signal is referenced $S_{Ae}$.

A device 12 adapted to the performance of one or more simple pre-processing operations, such as pre-accentuation, or again more complex processing operations such as linear distortion (where LinCompEx, which is the abbreviation for Linear Completion and Expansion) a method where the signal undergoes a dynamic compression and is transmitted so as to be accompanied by a robust bit stream (corresponding to ancillary data) describing the compression state.

When there are no ancillary data, the audio signal contains 2 Na real samples if Na cells have been reserved for its transmission. Otherwise, for B bits of ancillary data, the audio signal will contain 2Na-B/2 samples for example.

A device 13 adapted to converting the real or binary audio samples into complex samples, for example in the following way: two successive audio samples S(2n), S(2n+1) respectively form the real part and the imaginary part of the $n^{th}$ complex sample. These techniques are known to those skilled in the art and will therefore not be described in detail in the present description.

An interleaver 14 whose function is to disperse the complex points obtained by the device 13 for conversion into complex numbers, in the time-frequency space in order to limit the effect of the error packets during reception. This enables the audio signal to enjoy the same advantages as a purely digital signal in terms of decorrelation of the noise and destructuring of the scrambling. It is also indispensable in order to preserve a flat frequency spectrum for the signal which is identical to that of a purely digital signal.

A modulator 15, for example of the COFDM type belonging to the group predefined as a digital type modem. This modem has the function especially of forming the signal to be transmitted. From all the signals, which were hitherto in the frequency domain, the modulator generates the temporal signal, for example by discrete Fourier transform, adds guard signals and carries out a variety of post-processing operations, such as clipping, filtering etc before driving the power transmitter.

The signal is then received and processed by the reception part and according to the steps defined with reference to FIG. 3.

It is assumed that the signal SR received by the reception part has already undergone the classic reception processing operations: amplification, filtering, level regulation, AGC (automatic gain control), passage into base band. It then takes the form of complex temporal samples.

The samples are sent for processing in the different elements listed here below:

A device 20 adapted to the performance of a windowing operation. The role of the windowing operation is take up a part that is supposed to be stable from the signal SR. This is a part where substantially all the replicas of the signal received are present simultaneously. Each replica has its own delay, its own phase and its own amplitude. This is characteristic of the transmission channels in the frequency bands used and corresponds to the well-known phenomenon of multiple paths.

A device 21 adapted to the performance of a frequency correction. The frequency correction is designed to compensate for the frequency drifts of the transmitters and receivers as well as for the Doppler shift, if any, due to a variation in the transmitter/receiver distance and a mean temporary frequency shift of all the paths received.

A device 22 adapted to achieving the passage into the frequency domain, for example by means of a discrete Fourier transform.

A coherent demodulation system 23 and a system 24 adapted to carrying out various operations of synchronization concertedly to achieve the following all together:

Properly estimating the residual frequency shift to be compensated for,

Properly positioning the reception window,

For each output complex sample, estimating its complex value such as it was at transmission (complex value standardized after estimation and compensation for the complex gain of the channel) as well as the signal-to-noise ratio which depends both on the time (non-stationary channel) and on the frequency (frequency selective channel and presence of scrambling at varyingly narrow bands).

The demodulation system receives the signal sample after passage into the frequency domain.

A de-interleaver 25 whose function is to reposition, in the original order, the complex samples coming from the demodulation device and accompanied by their estimated values of signal-to-noise ratio; this de-interleaver also receives the various synchronizations, A demultiplexer 26 which separates the purely <<digital>> samples corresponding to the utility functions, the synchronization and the control data of the analog audio signal from those assigned to the <<analog audio>> link; at output there are the samples forming the final audio signal which are transmitted to:

A device 27 adapted to the performance of post-processing operations which, as the case may be, make use of the above-mentioned control data and carry out processing operations which are the reverse of those done at transmission (during the pre-processing operation), as well as other processing operations such as, for example, the rejection of the background noise.

As a result of the compensation of the gain of the channel obtained by the demodulator 23, the level of the signal does not vary with the gain of the channel, contrary to what happens in a classic AM or SSB (Single Side Band) type transmission. Furthermore, the frequency spectrum of the additional noise is almost flat in the short term, namely it is uniformly distributed in the audio band (white noise but not obligatorily Gaussian) and can easily be eliminated by classic methods, for example by spectral subtraction.

The <<perceptual>> reduction of the noise can also be considerably improved by a modification of the frequency spectrum of the audio signal at transmission associated with the reverse modification to that made at reception. The effect of these modifications is to mask the noise, in ensuring that its intensity is always smaller than that of the useful audio signal, whatever the audio frequency considered.

The pre-processing and post-processing operations may be performed according to the methods described in Roch Lefebvre & Claude Laflamme, "Spectral Amplitude Warping (SAW) for Noise Spectrum Shaping in Audio Coding", University of Sherbrooke, Quebec, Canada, J1 K 2R1.

The method of the invention can be applied, for example, in a transceiver device comprising a single-carrier type of modem.

Figure 4:
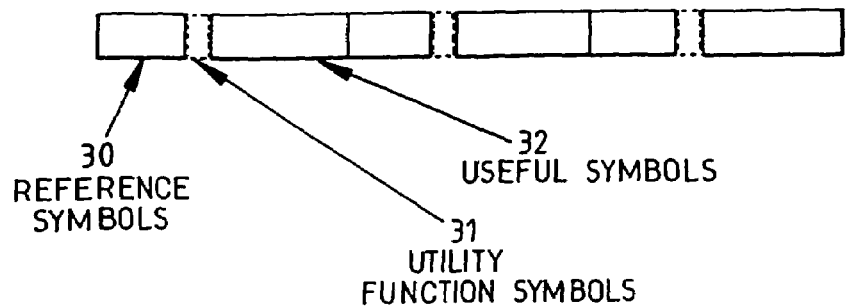
FIG. 4 depicts a single-carrier type continuous modulation.

FIG. 4 shows a classic diagram of the construction of a single-carrier continuous modulation.

The modulation comprises reference symbols 30, utility function symbols 31 and useful symbols 32, distributed in different blocks in series.

The audio analog signal to be transmitted is distributed at the level of the useful symbols 32. The reference symbols 30 are used to make an estimate of the propagation conditions. This estimate is then used to compensate for the fluctuations (i.e. to carry out equalization). The utility function symbols 31 are digitally modulated and contain information used by the receiver to determine the processing operations to be performed, for example as a function of the service and of the processing operations performed at transmission. For example, the receiver determines the characteristics of the signal that it is receiving (interleaving used, synchronization, cipher, etc.). They may be distributed in the frame as shown in FIG. 3 or again concentrated, for example, in the header, at the start of the communication and/or repeated so that the totality of the data can be received even if the start of the communication is missed.

The band needed to transmit a speech or audio signal is computed in taking account of the proportion of the symbols used for purposes other than that of conveying samples of the analog symbol to be transmitted. This computation consists, for example in increasing the modulation speed, and hence the occupied band, by the same proportion.

If we again take up the above assumption of 10% of symbols used for the utility functions, the modulation rhythm obtained is of the 3000 baud type, i.e. at about 3 KHz. This may vary as a function of the bandwidth of the transmission filter used.

It is also possible to use a greater number of reference symbols. This makes the estimation of the reception more robust and, consequently, makes it possible to stand up to the more difficult propagation channels (which is the typical case in HF). The temporal distribution of these symbols may also take a variety of forms, for example as defined in the NATO STANAG 4285 or 4539 standards known to those skilled in the art.

The diagrams of the transmitter and receiver parts are similar in their use for an OFDM type modulation. In the modulation chain, the reverse FFT and the insertion of the guard samples are replaced by a single-carrier modulation. On the reception side, the FFT operation and the gain correction of the channel are replaced by a (linear, block or other) equalizer.

According to another alternative embodiment of the invention, the method is applied to a spread spectrum modem. It comprises the steps described here above and a step where the single-carrier modulation is then <<spread>> by a multiplication by means of a spread code which makes it possible, in reception, to benefit from the diversity of wideband propagation.

Figure 5:
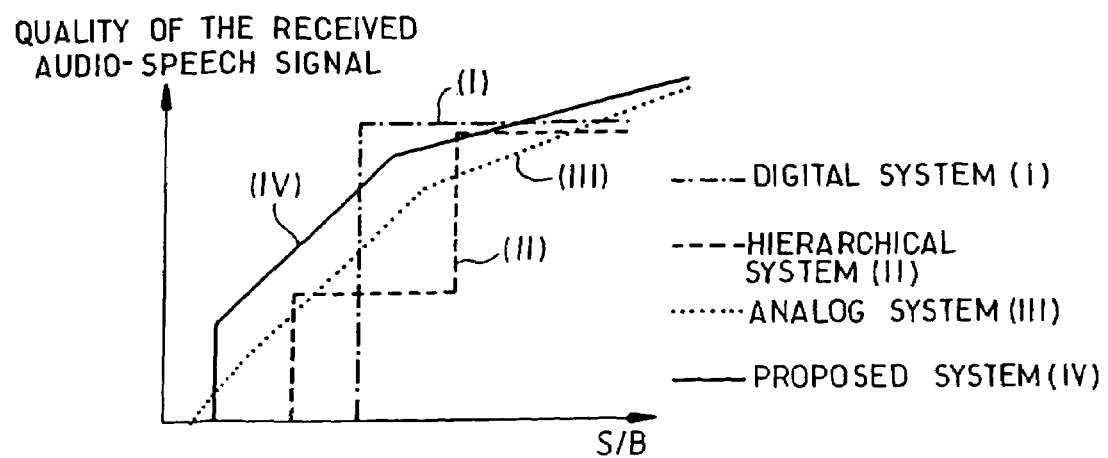
FIG. 5 shows different comparative curves of the quality of the signal, obtained by implementation of known prior art techniques and by the implementation of the present invention.

FIG. 5 is a graph of the quality of the output signal (y-axis) and of the signal-to-noise ratio (x-axis) that shows different curves representing the evolution of the quality of the output signal as a function of the different systems existing in the prior art, the digital system (curve I), the hierarchical system (curve II), the analog system (curve III) and the system according to the invention (curve IV). These curves clearly show the improved quality obtained by using the system according to the invention.

It can be noted that the digital systems work with a quality independent of the value of the signal-to-noise ratio received up to the total break that takes place at a fairly early stage even if the intermediate hierarchies work with an intermediate stage. The difference between the analog systems and the proposed system lies in the resistance of the proposed system to the disturbed propagation because the digital processing in reception enables the equalizing of the channel and therefore the improved reconstitution of the original signal.

What is claimed is:

1. A method for transmitting an analog signal comprising:
   inputting said analog signal;
   sampling said analog signal at a predetermined frequency to generate a sampled analog signal;
   converting the sampled analog signal into complex numbers such that two successive samples of said sampled analog signal respectively form a real part and imaginary part of a respective complex number;
   dispersing the complex numbers in a time-frequency space; and
   modulating the dispersed complex numbers through a digital modulator into temporal signals and outputting the temporal signals for transmission.

2. A method according to claim 1, further comprising:
   pre-processing the sampled analog signal prior to the converting.

3. A method according to claim 2, wherein the pre-processing comprises at least one of pre-accentuation, linear distribution, or dynamic compression of the sampled analog signal.

4. A method according to claim 2, further comprising:
   filtering the input analog signal prior to the sampling.

5. A method according to claim 1, wherein the digital modulator outputs the complex numbers associated with respective of N independently modulated time-frequency cells used to transmit the temporal signals.

6. A method according to claim 1, wherein the digital modulator is one of an OFDM (Orthogonal Frequency Division Multiplexing) or COFDM (Coherent Orthogonal Frequency Division Multiplexing) modem.

7. A method according to claim 1, wherein the digital modulator comprises a single-carrier modem.

8. A method according to claim 1, wherein the input analog signal is an audio or speech signal.

9. A device for transmitting an analog signal comprising:
an input receiving said analog signal;
a sampling module configured to sample said analog signal at a predetermined frequency to generate a sampled analog signal;
a converting module configured to convert the sampled analog signal into complex numbers such that two successive samples of said sampled analog signal respectively form a real part and imaginary part of a respective complex number;
an interleaving module configured to disperse the complex numbers in a time-frequency space; and
a digital modulator configured to modulate the dispersed complex numbers into temporal signals and to output the temporal signals for transmission.

10. A device according to claim 9, further comprising:
a pre-processor configured to pre-process the sampled analog signal prior to the conversion.

11. A device according to claim 10, wherein the pre-processor performs at least one of pre-accentuation, linear distortion, or dynamic compression of the sampled analog signal.

12. A device according to claim 10, further comprising:
a filter configured to filter the input analog system prior to the sampling.

13. A device according to claim 9, wherein the digital modulator outputs the complex numbers associated with respective of N independently modulated time-frequency cells used to transmit the temporal signals.

14. A device according to claim 9, wherein the digital modulator is one of an OFDM (Orthogonal Frequency Division Multiplexing) or COFDM (Coherent Orthogonal Frequency Division Multiplexing) modem.

15. A device according to claim 9, wherein the digital modulator comprises a single-carrier modem.

16. A device according to claim 9, wherein the input analog signal is an audio or speech signal.

17. A device for transmitting an analog signal comprising:
means for inputting said analog signal;
means for sampling said analog signal at a predetermined frequency to generate a sampled analog signal;
means for converting the sampled analog signal into complex numbers such that two successive samples of said sampled analog signal respectively form a real part and imaginary part of a respective complex number;
means for dispersing the complex numbers in a time-frequency space; and
means for modulating the dispersed complex numbers through a digital modulator into temporal signals and outputting the temporal signals for transmission.

18. A device according to claim 17, further comprising:
means for pre-processing the sampled signal prior to the converting.

* * * * *